(12) United States Patent
Nomura et al.

(10) Patent No.: US 11,009,853 B2
(45) Date of Patent: May 18, 2021

(54) METHOD OF TOOL PATH GENERATION FOR ADDITIVE MANUFACTURING WITH VECTOR DISTRIBUTION

(71) Applicant: Toyota Motor Engineering & Manufacturing North America, Inc., Plano, TX (US)

(72) Inventors: Tsuyoshi Nomura, Novi, MI (US); Ercan Mehmet Dede, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 15 days.

(21) Appl. No.: 16/524,421

(22) Filed: Jul. 29, 2019

(65) Prior Publication Data

US 2021/0034036 A1    Feb. 4, 2021

(51) Int. Cl.

| | |
|---|---|
| *G05B 19/4099* | (2006.01) |
| *G05B 19/19* | (2006.01) |
| *B29C 64/386* | (2017.01) |
| *B33Y 10/00* | (2015.01) |
| *B33Y 50/02* | (2015.01) |

(52) U.S. Cl.
CPC ........ *G05B 19/4099* (2013.01); *B29C 64/386* (2017.08); *G05B 19/19* (2013.01); *B33Y 10/00* (2014.12); *B33Y 50/02* (2014.12)

(58) Field of Classification Search
CPC .. G05B 19/4099; G05B 19/19; B29C 64/386; B33Y 10/00; B33Y 50/02
See application file for complete search history.

(56) References Cited

U.S. PATENT DOCUMENTS

| | | |
|---|---|---|
| 9,149,988 B2 | 10/2015 | Mark et al. |
| 9,370,896 B2 | 6/2016 | Mark |
| | (Continued) | |

FOREIGN PATENT DOCUMENTS

JP    2019116104 A   *   7/2019    ........... B29C 64/118

OTHER PUBLICATIONS

Effimia Giannopoulou et al 2019 IOP Conf. Ser.: Mater. Sci. Eng. 471 102053 (Year: 2019).*

(Continued)

*Primary Examiner* — Chad G Erdman
(74) *Attorney, Agent, or Firm* — Christopher G. Darrow; Darrow Mustafa PC (57) ABSTRACT

Methods are provided for designing and generating a tool path for three-dimensional printing of a fiber composite part. The method includes defining a three-dimensional domain model and determining a set of boundary conditions for the three-dimensional domain model. The methods include applying a gradient-based algorithm to a predetermined stress state located within the three-dimensional domain model in order to: (1) optimize the three-dimensional domain model for minimum deflection or stress using a structural mechanics algorithm for a composite article, and (2) provide a topologically optimized fiber composite part design and fiber orientation field. The methods include using the topologically optimized fiber composite part design and fiber orientation field as an input to solve Gray-Scott reaction diffusion equations to generate an anisotropic tool path for three-dimensional printing of the fiber composite part.

20 Claims, 10 Drawing Sheets

(56) References Cited

U.S. PATENT DOCUMENTS

| | | | |
|---|---|---|---|
| 9,656,429 | B1 | 5/2017 | Mantha et al. |
| 9,688,028 | B2 | 6/2017 | Mark et al. |
| 9,694,544 | B2 | 7/2017 | Mark et al. |
| 9,789,652 | B2 | 10/2017 | Armstrong |
| 2009/0037148 | A1* | 2/2009 | Lin .................. A61F 2/447 703/1 |
| 2017/0173868 | A1 | 6/2017 | Mark |
| 2017/0334136 | A1 | 11/2017 | Mark et al. |
| 2018/0065309 | A1 | 3/2018 | Tyler et al. |
| 2018/0370145 | A1 | 12/2018 | Woytowitz |
| 2018/0372488 | A1 | 12/2018 | Winfree et al. |

OTHER PUBLICATIONS

Richter, E. et al., Thermoplastic Composit Parts Based on Online Spun Commingled Hybrid Yarns With Continuous Curvilinear Fibre Patterns, ECCM16—16th European Conference on Composite Materials, Seville, Spain Jun. 22-26, 2014 (8 pages).

* cited by examiner

METHOD OF TOOL PATH GENERATION FOR ADDITIVE MANUFACTURING WITH VECTOR DISTRIBUTION

TECHNICAL FIELD

The present disclosure generally relates to methods for additive manufacturing and, more particularly, to methods for tailoring and customizing the generation of a tool path for printing a three-dimensional composite parts.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Tool paths may be used with additive manufacturing techniques to generate a pattern useful for the creation of an object. With additive manufacturing techniques that create anisotropic materials for reinforcement, such as continuous fiber printing (CFP) and tailored fiber placement (TFP), the tool path design may become more important in the structural integrity of the created object. In certain aspects, it is useful to have evenly pitched parallel paths with a width of the tooltip to fill the space. The conventional tool paths for CFP and TFP are based on geometrical information, and may be determined by manual design either by engineers or using design rules, such as a concentric rule (tool path is parallel to the outer perimeter) or isotropic (stacking of unidirectional oriented parallel pattern), or may be determined based on a structural analysis result. Alternatively, if one wants to achieve a fiber layout to follow a given vector field with anisotropic topology optimization, the tool paths are manually drawn in order to satisfy two main conditions. First, that there is an evenly pitched parallel space filling condition. Second, that the given orientation distribution is followed as much as possible. The manual optimization is both time consuming and costly. In certain automatic generation cases, conventional algorithms are based on stream line tracing of points that move along with a given direction, which is difficult to control a distance between paths.

Accordingly, it would be desirable to provide improved, cost effective, and automated methods of tool path generation that can be customized for various design considerations.

SUMMARY

This section provides a general summary of the disclosure and is not a comprehensive disclosure of its full scope or all of its features.

In various aspects, the present teachings provide a method for designing and generating a tool path for three-dimensional printing of a fiber composite part. The method includes defining a three-dimensional domain model and determining a set of boundary conditions for the three-dimensional domain model. The methods include applying a gradient-based algorithm to a predetermined stress state located within the three-dimensional domain model in order to: (1) optimize the three-dimensional domain model for minimum deflection or stress using a structural mechanics algorithm for a composite article, and (2) provide a topologically optimized fiber composite part design and fiber orientation field. The methods include using the topologically optimized fiber composite part design and fiber orientation field as an input to solve Gray-Scott reaction diffusion equations to generate an anisotropic tool path for three-dimensional printing of the fiber composite part.

In other aspects, the present teachings provide a three-dimensional fiber composite part or article made in accordance with the methods described herein. In various aspects, the three-dimensional fiber composite article includes at least one fiber reinforcement having a shape and size defining a three-dimensional domain space. The fiber reinforcement is disposed in the three-dimensional domain space in a predetermined pattern having a predetermined fiber direction and pitch path. The predetermined pattern is based on an anisotropic tool path obtained by solving Gray-Scott reaction-diffusion equations. The predetermined pattern may have a variable pitch path that is based on one of a localized thickness of the fiber composite article, and a localized predetermined stress state of the fiber composite article.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DETAILED DESCRIPTION

Additive manufacturing is a technique used to create a three-dimensional component by aligning and/or depositing overlapping layers of materials under the guided control of a computerized or programmed device. The present technology generally teaches methods for optimizing the generation of a tool path useful for additive manufacturing of an article or part. In particular, the present technology pertains to the creation of a fiber composite component with fibers as the additive material.

Conventional tool paths are usually generated based solely on geometrical information alone. The desired tool path for additive manufacturing follows a given vector field for the three-dimensional printing. However, if one wants to achieve a fiber layout to follow a given vector field with anisotropic topology optimization, the paths are manually drawn in order to satisfy two main conditions. First, that there is an evenly pitched parallel space filling condition. Second, that the given orientation distribution is followed as much as possible. In this regard, the novel tool path of the present technology is generated based on a contour of a field value of modified Gray-Scott (GS) equations. In various aspects, the GS equations can generate a line and space pattern with an even pitch by providing an appropriate parameter set. For example, the line direction is affected by boundary and initial value, and the GS equation is then modified with a different diffusion tensor for more control of the tool path generation. In various aspects, components can be made using a fine tow carbon composite, for example, having a diameter or thickness of between about ¼ to about ⅛ inch. The fibers can be oriented throughout the domain space in conjunction with a stress scalar/tensor, for example, along principal stress directions, or along principal, secondary, tertiary, etc. directions, depending upon the nature of a stress and/or strain input model and von Mises yield criterion.

The use of the modified GS equation provides the distribution of an anisotropic diffusion tensor on its diffusion term, and the diffusion tensor is also time dependent. The path pitch can be defined by the value of the diffusion coefficient. In the modified GS equation, the second principal element of the diffusion tensor (i.e., the short axis of the diffusion tensor) is kept constant, but the first principal element is time dependent and is stretched out to be larger in the given direction. The amount of stretch is controlled by time. For example, by making it larger, the pattern becomes more directional, but at the same time, it becomes coarse because the diffusion value itself becomes larger in the given direction. To the contrary, if the diffusion tensor element in the first principal direction becomes smaller, ultimately the same value as the second principal direction, that is isotropic, the pattern becomes less directional. However, due to the nature of the original GS equation, the line direction depends on the initial, or previous state, and the pattern still keeps the given direction distribution. The methods of the present technology repeatedly solve the GS equations for some time period and switch the anisotropy strength using at least two sets of diffusion tensors. By respectively changing the amount of stretch by time, the line pattern becomes more continuous, follows well, and is well packed.

In various aspects, the present technology additionally provides a gradual path pitch distribution control. For example, in the case of additive manufacturing techniques using tailored fiber placement (TFP), the path generally determines the thickness of the product. Thus, the path pitch distribution control can be an important variable used to design a variable thickness product. With the present technology, changing the value of the diffusion coefficient by the thickness distribution generates a pattern for a variable thickness. In this regard, the relationship between the thickness and the diffusion coefficient is linear.

In addition to three-dimensional optimization where the fiber content is designed locally in three-dimensional space, the present technology is also applicable to two dimensionally optimized components. For example, in instances where full three-dimensional optimization is cost prohibitive with respect to the amount of computational time required, a two-dimensional composite part optimization may be performed. In this regard, the tailoring of the TFP path pitch spacing and product thickness may be logically linked to a stress magnitude, for example, a Von Mises stress, where tighter pitch spacing and thus final part thickness corresponds to higher levels of stress, and vice versa.

As will be described in more detail below, the extraction of the path from the GS equation results from obtaining a scalar field. The output pattern is a distribution of high scalar values and low scalar values, similar to monochrome image data where a high value is black, and a low value is gray. In certain aspects, the line pattern itself may contain many branches. However, it should be understood that branches are not desirable for the tool path because it would require extra movement to branch points, and extra starting points in the middle of the work area. The present technology uses a contour of the scalar field to generate a tool path, thus preferably generating a group of paths that do not have any branches.

In various aspects, methods for designing and generating a performance sensitive tool path for a composite fiber component first include defining boundary conditions and loads for an optimization domain. Certain methods may include performing an interpolation process. Many exemplary methods include using a gradient-based topology algorithm (MMA or GCMMA) looped in with a stress analysis, the domain is then optimized for minimum deflection (or minimum stress, depending on the objective) using the standard structural mechanics formulations for the composite media. Based on the topology optimized design and fiber orientation field, the GS equations are utilized to generate an anisotropic tool path for TFP or continuous fiber printing (CFP). The fiber spacing may be based on the desired final part thickness, printing constraints and the aforementioned design information.

Figure 1:
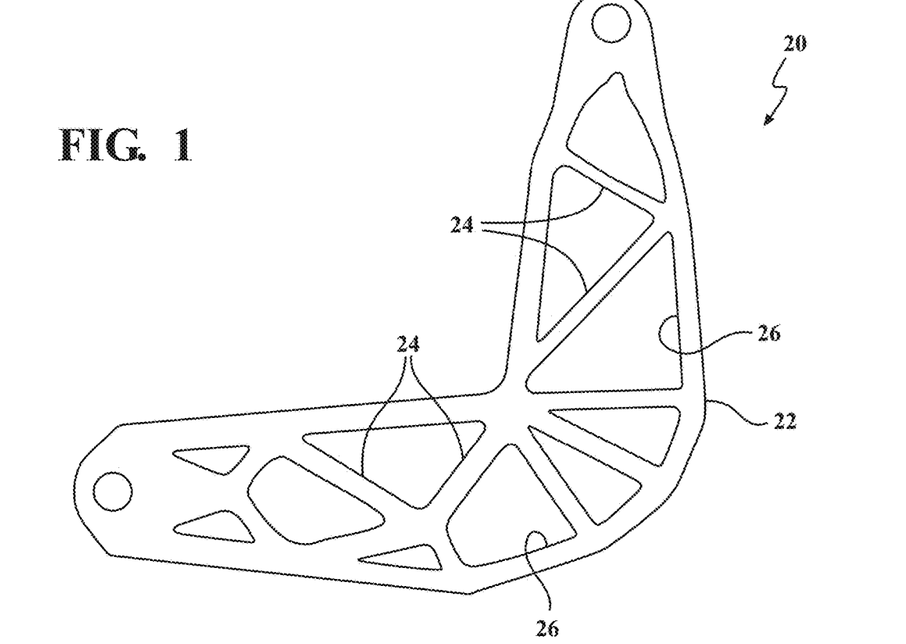
FIG. 1 generally illustrates a shape of an exemplary component that can be made using a performance sensitive tool path, such as a continuous fiber printing path, or similar fused deposition modeling style printing path technique.

FIG. 1 generally illustrates a shape of an exemplary truss structure component 20 that can be made using additive manufacturing techniques with a performance sensitive tool path, such as a continuous fiber printing path technique, or similar fused deposition modeling style printing path technique. The component 20 may be provided with a shape defined by an outer perimeter 22 and may include various structural cross-members 24 located between the outer perimeter 22 and collectively defining a plurality of apertures 26 where either no fibers are present for purposes of reinforcing the component 20, or another fill material is provided that does not require or benefit from a shaped or tailored pattern.

Figure 2:
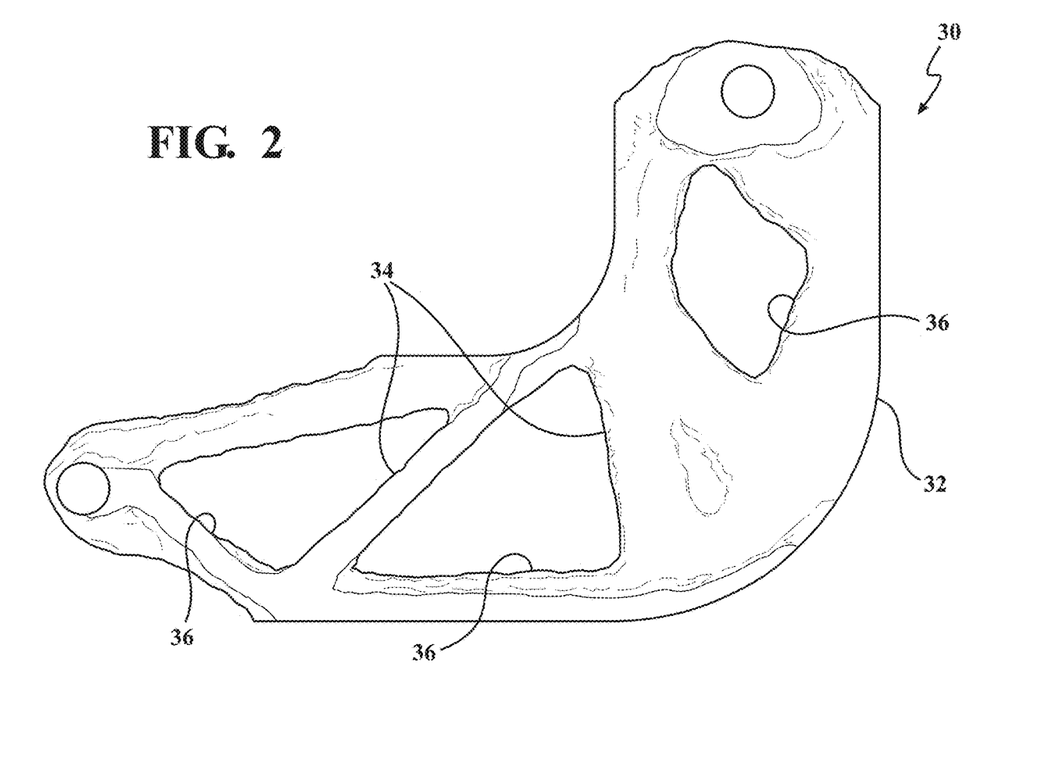
FIG. 2 is a top plan view providing a three-dimensional representation of geometry data of an exemplary component to be made using the methods and techniques of the present technology.

FIG. 2 is a top plan view providing a three-dimensional representation of geometry data of another exemplary component 30, the shape of which will be used to further describe features of the present technology. Similar to FIG. 1, the component 30 of FIG. 2, which may also be referred to as a part or article, has a shape generally defined by fibers disposed in an outer perimeter 32 and may include various cross-members 34 located between the outer perimeter 32 and collectively defining a plurality of apertures 36 where either no fibers are present for purposes of reinforcing the component 30, or another fill material is provided that does not require or benefit from a shaped or tailored pattern. FIG. 2 may be used to provide the initial inputs that are useful with the methods of the present technology. The initial inputs for the boundary and geometry data useful with the present technology may be explicit or implicit, or a combination of both; in certain instance, at least a portion of the data may be estimated. Explicit data, for example, may include polygonal mesh and surface mesh data, CAD data, and the like. Implicit data can include data obtained from a density distribution, rendering volume images, point clouds, a slice image data set, and the like.

Figure 3:
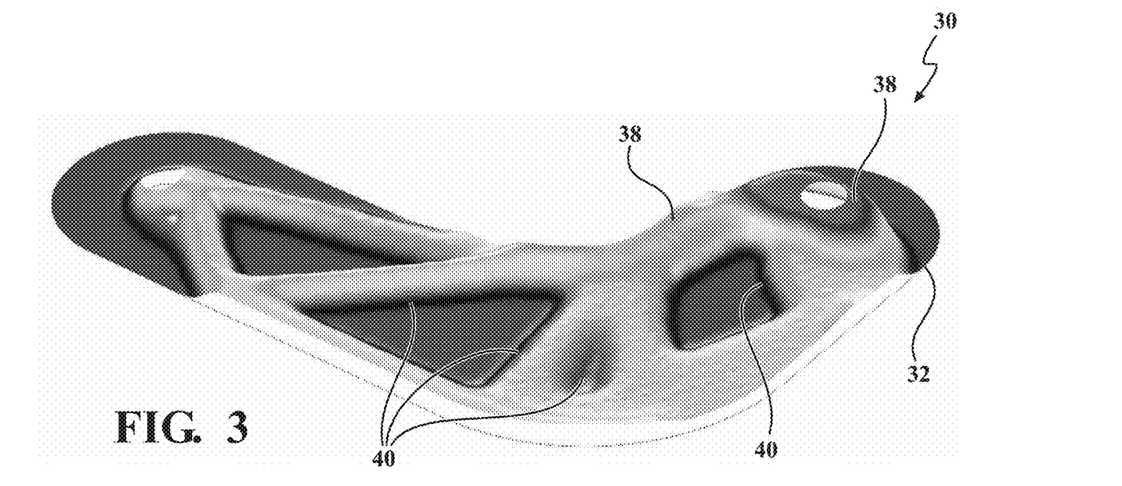
FIG. 3 provides a perspective view of the component of FIG. 2 better illustrating the height field; in various aspects, the height field can be calculated with the geometry data.

FIG. 3 provides a perspective view of the component of FIG. 2 better illustrating the height field and variance in elevation of the component 30. In various aspects, the height field can be calculated with the geometry data. For example, areas with the greatest height are indicated by reference number 38, the areas provided with the lowest height are indicated by reference number 40. Exemplary composite fiber orientation data for the component of FIGS. 2-3 is provided in FIG. 4. As shown, the various directional arrows 42 are provided with a substantially uniform spacing, and do not account for differences in height.

Figure 4:
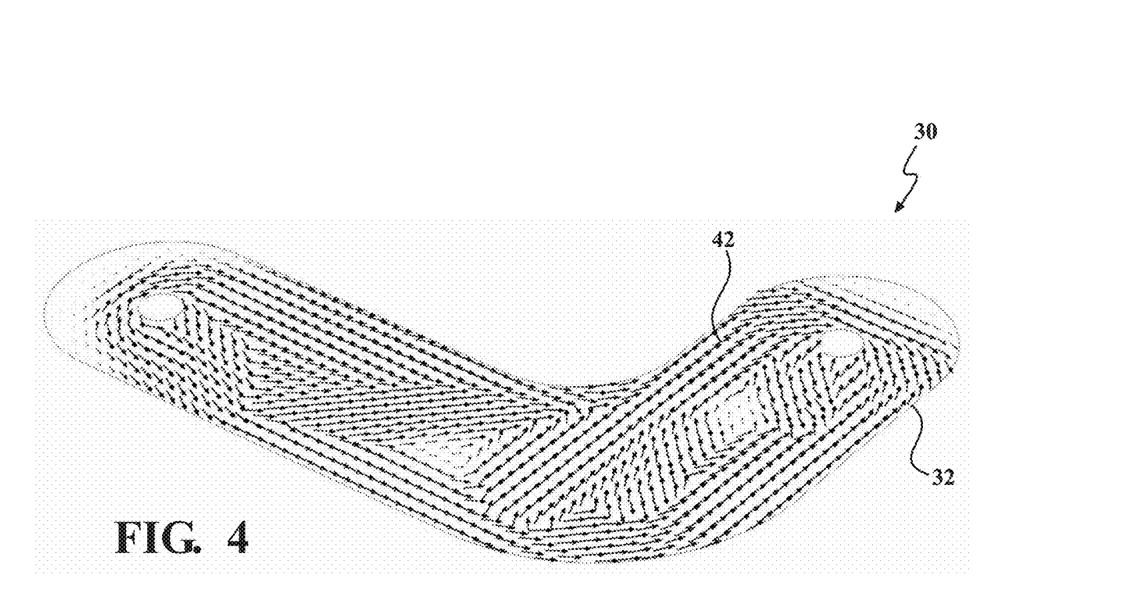
FIG. 4 illustrates vector field orientation data for the exemplary component of FIGS. 2-3.
Figure 5:
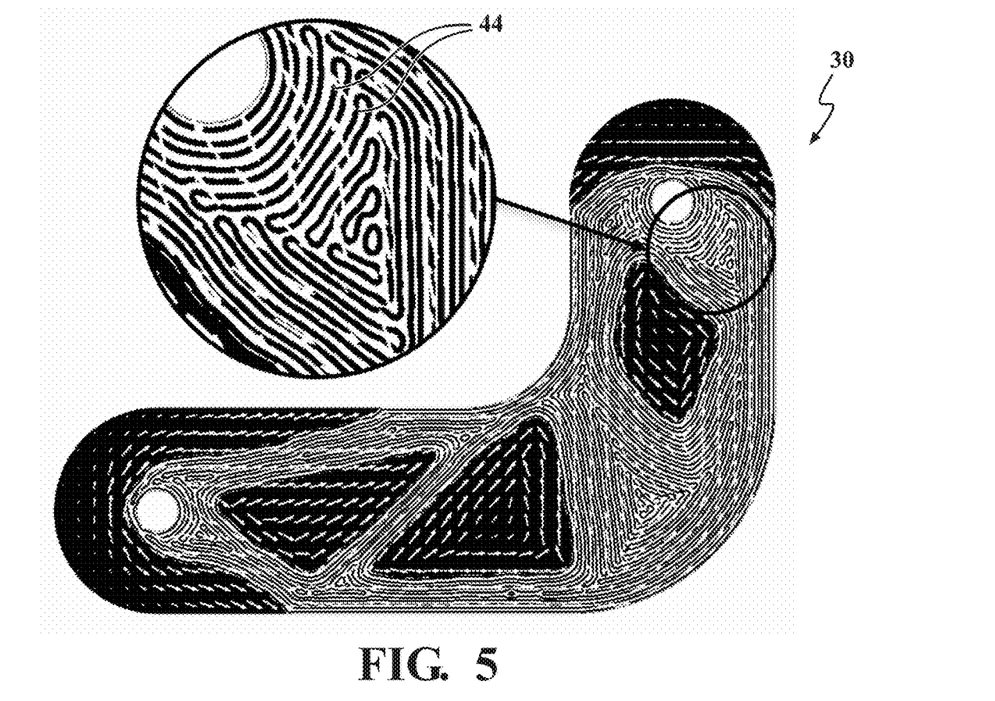
FIG. 5 is a schematic providing an illustration of conventional orientation data similar to FIG. 4.

FIG. 5 is a schematic providing an illustration of conventional fiber reinforcement orientation pattern data, similar to FIG. 4, but using what is often referred to as the concentric rule. In other words, the tool path is generally parallel to (concentric with) the outer perimeter of the area to be printed. Such a design may not be preferred or desirable. For example, as can be seen in the magnified portion of FIG. 5, certain of the directional arrows 44 are provided with the wrong orientation with respect to the concentric design.

Figure 6:
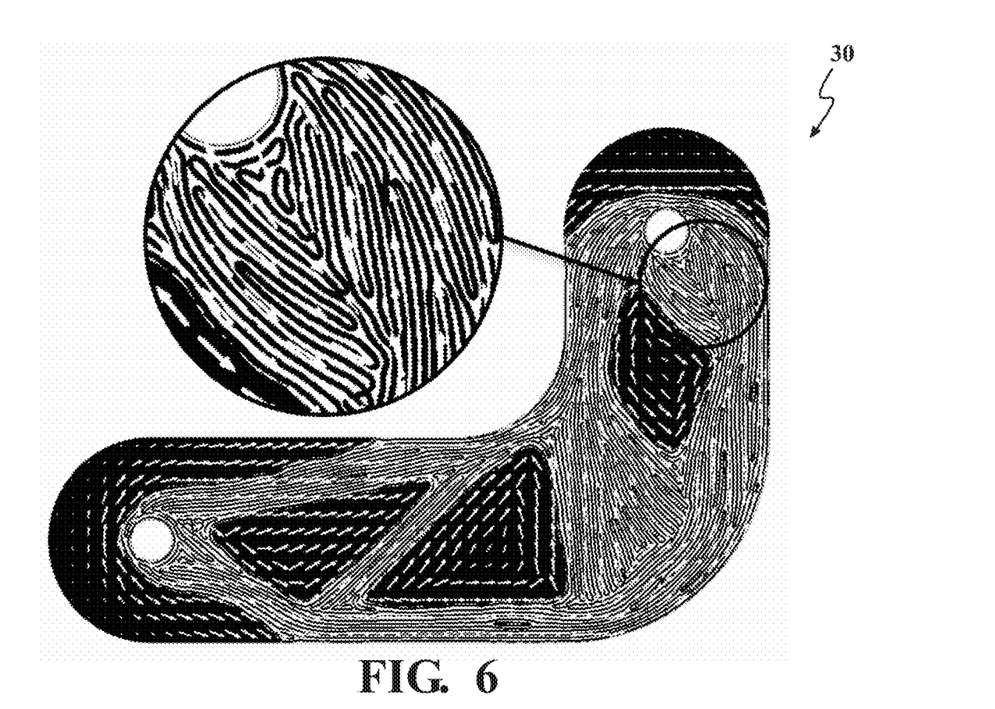
FIG. 6 is a schematic providing an illustration of orientation data according to one aspect of the present technology that generally provides an even pitch, for example, it follows a given orientation while filling the area; it is provided with closed perimeters, suitable for a three-dimensional printing path.

FIG. 6 is a schematic providing an illustration of orientation data according to one aspect of the present technology that generally provides an even path pitch for the component 30. As shown, the path follows a given orientation while filling the areas. It is provided with closed perimeters, suitable for a three-dimensional printing path. When there is an explicit boundary, in one example, a Dirichlet (or first-type) boundary condition can be applied to be zero on all boundaries. As is known in the art, the Dirichlet is a type of boundary condition that, when imposed on an ordinary or a partial differential equation, specifies the values that a solution needs to take on along the boundary of the domain. In applied sciences, a Dirichlet boundary condition may also be referred to as a fixed boundary condition. When there is an implicit boundary (e.g. density distribution), in one example, methods include setting the source term of the GS equations to zero at the outside of the domain, to multiply the source term by the density.

Figure 7:
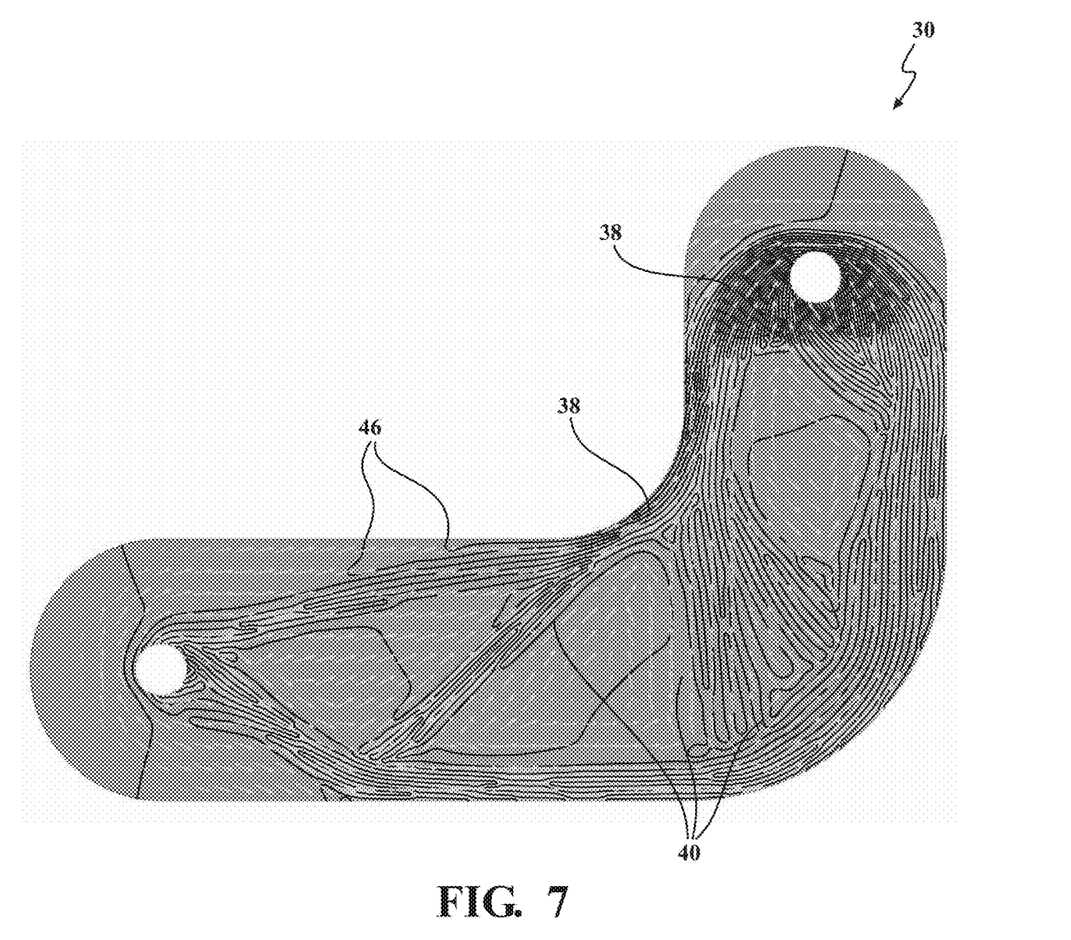
FIG. 7 is a schematic providing an illustration of orientation data according to another aspect of the present technology that generally provides a variable pitch; it is provided with open perimeters, suitable for a tailored fiber placement fiber path.

FIG. 7 is a schematic providing an illustration of orientation data according to another aspect of the present technology that generally provides a variable pitch path. As shown, this component 30 design is provided with an open perimeter. For example, the path fixes a starting point at the outside of the domain, indicated by reference number 46, which is suitable for the TFP path. There is no boundary condition for this aspect, and the methods include setting a very large diffusion coefficient on the outside of the domain. With renewed reference to FIG. 3 in conjunction with FIG. 7, areas with a low height, indicated by reference number 40, have a wider path pitch. Whereas the areas provided with the greatest height, indicated by reference number 38, have a narrower path pitch.

Figure 8:
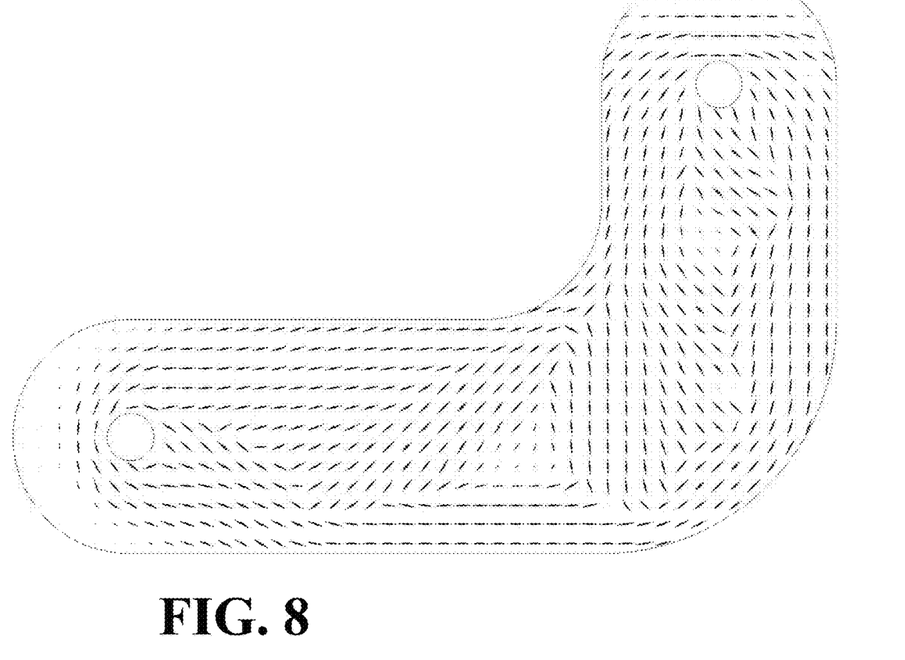
FIG. 8 provides a graphic illustration of input data from an orientation field (a vector field)
Figure 14:
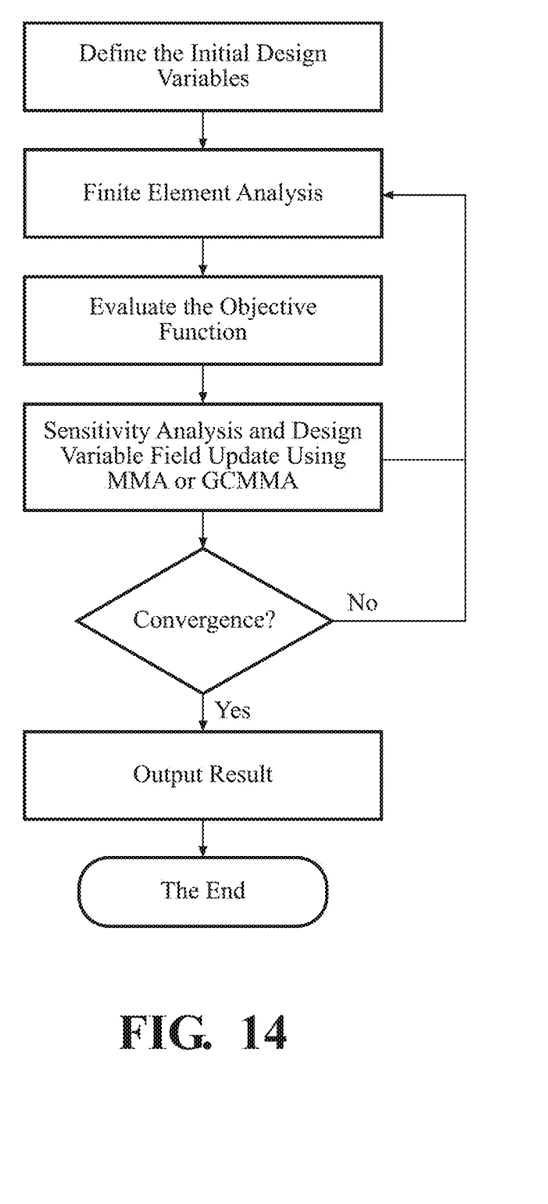
FIG. 14 is a flowchart of an exemplary gradient based algorithm using method of moving asymptotes (MMA) or globally convergent method of moving asymptotes (GCMMA) to optimize the domain.

To further understand the methods of the present technology, FIGS. 8-11 provide additional illustrations of the progression from input data to output line data after using the various gradient-based algorithms and solving the Gray-Scott reaction diffusion equations using the methods of the present technology. FIG. 8 provides another example of orientation field data in the form of vector field or stress field data that can be used to optimize the fiber pattern. In various aspects this can be obtained from one of a method of moving asymptotes (MMA) topology optimization and a globally convergent method of moving asymptotes (GCMMA) topology optimization. (FIG. 14 is a flowchart of an exemplary gradient based algorithm using MMA or GCMMA to optimize the domain.) In various aspects, a principal stress direction can be used as the vector field as an alternative to the topology optimization.

Figure 9:
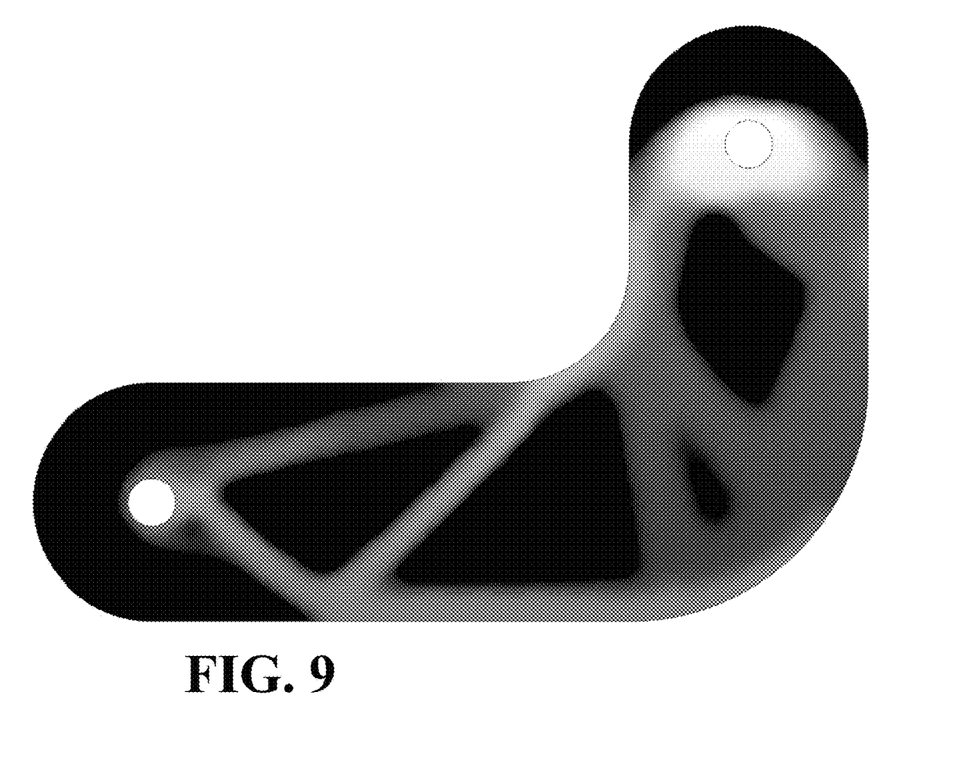
FIG. 9 provides an illustration of input data from a height field (a scalar field)
Figure 10:
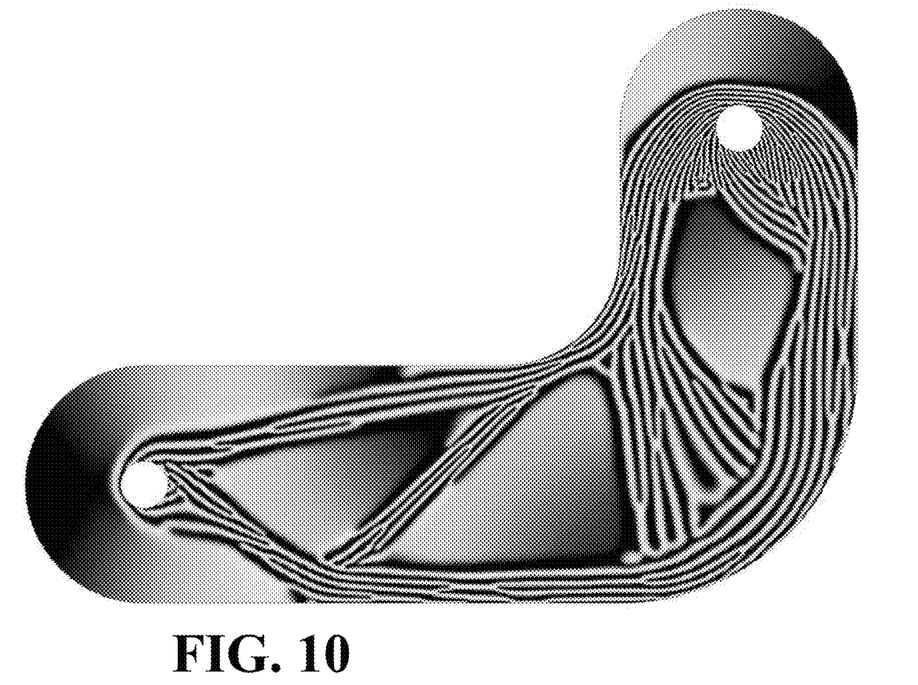
FIG. 10 provides an exemplary pattern generation using the Gray-Scott pattern (a scalar field) according to the present technology.
Figure 11:
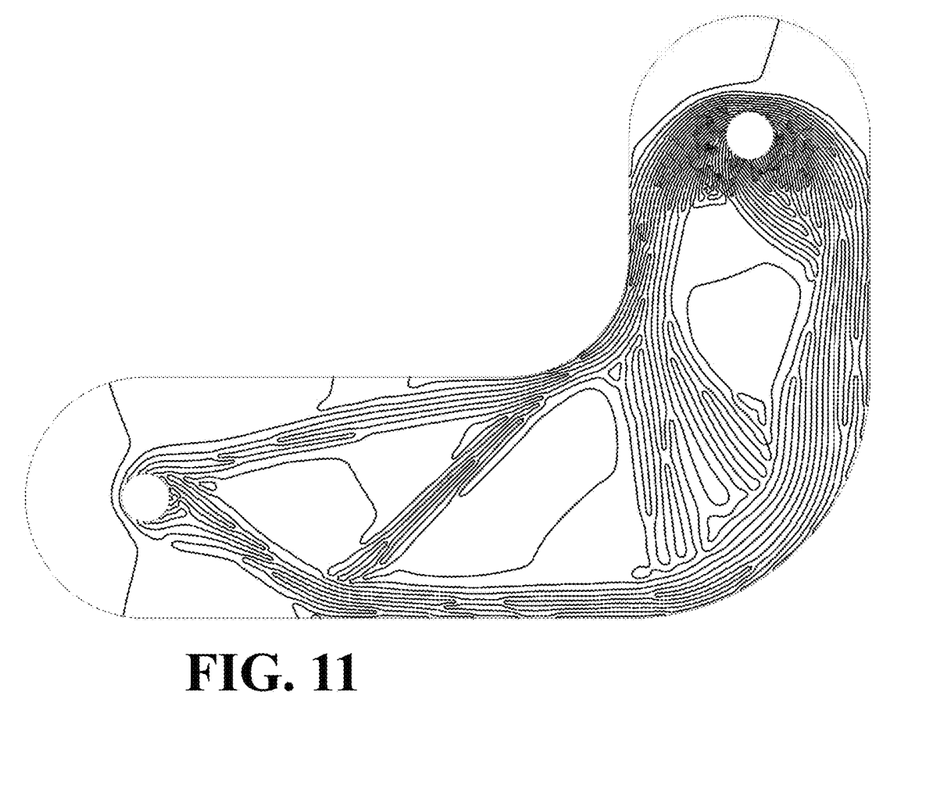
FIG. 11 provides an exemplary contour extraction that yields a tool path (line data) according to the present technology.

FIG. 9 provides another example of the height field, or scalar field, which is generally a variation in thickness. As shown in FIG. 9, the darkest areas are provided with the lowest height, while the lighter gray-scale indicates a greater height; the height directly relating to thickness. FIG. 10 provides an exemplary pattern generation using the Gray-Scott pattern (a scalar field) solved according to the present technology. FIG. 11 provides an exemplary contour extraction that yields a tool path (line data) from the pattern provided in FIG. 10 according to the present technology. It should be understood that in various aspects, in order to arrive at the continuous line path of FIG. 11, it may be necessary to eliminate any undesired paths that may have developed using the GS equations. Thus, the methods may include the steps of reviewing the anisotropic tool path resulting from the GS equations and looking for any areas that may include a branching pattern, or an area that includes the path leading to a "dead end" or isolated domain that would be potentially problematic in making the contour line as a single stroke. In this regard, the elimination of any undesired paths and/or branches may be done intuitively by an individual using a manual process, or it is envisioned that they can be detected and removed using automated methods and software.

Figure 12:
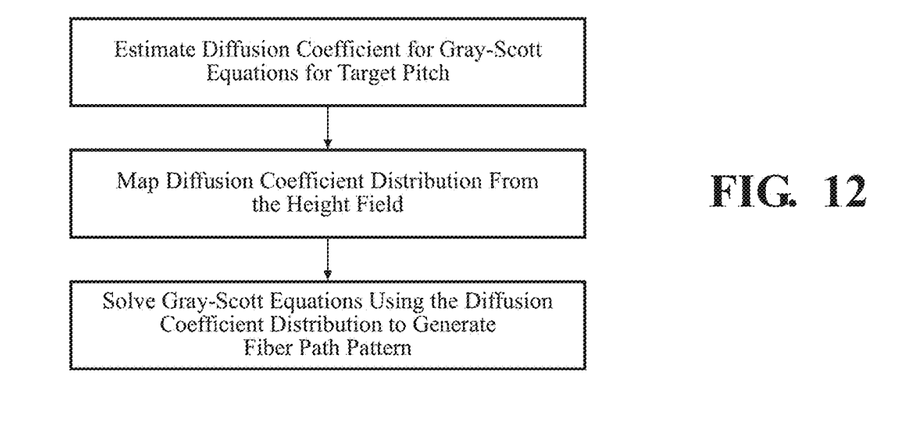
FIG. 12 illustrates an exemplary method flow chart for designing the fiber path pattern according to various aspects of the present technology.
Figure 13:
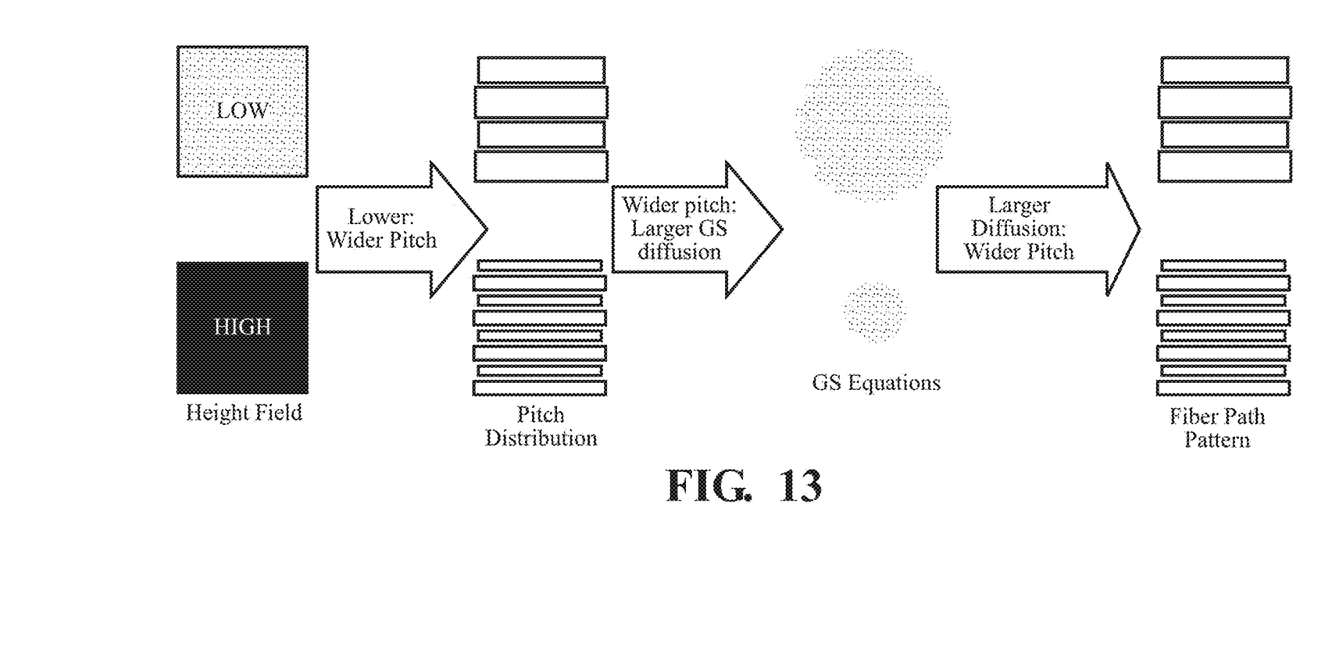
FIG. 13 illustrates an exemplary schematic generally summarizing key features of the methods of designing the path patterns and pitch useful herein.

FIG. 12 illustrates an exemplary method flow chart for designing the fiber tool path pattern according to various aspects of the present technology. FIG. 13 illustrates an exemplary schematic generally summarizing key features of the methods of designing the path patterns and pitch useful herein. The present technology generally focuses on the design of a tool path pattern and designs so that it can be configured for use with an additive manufacturing process. In various aspects, the three-dimensional fiber composite components may be made from one or more one fiber reinforcement material component. Non-limiting examples of useful fiber reinforcements include: an engineering thermoplastic material; a plurality of fiber reinforcements; a fiber filament; and a fiber tow.

Methods of designing a tool path for printing a three-dimensional fiber composite part may begin with defining a predetermined three-dimensional domain model of a fiber composite part along with a set of boundary conditions for the three-dimensional domain model. The methods may include defining a predetermined stress state within the three-dimensional domain model by applying a predetermined load to the three-dimensional domain model. A stress gradient-based algorithm may then be used to optimize the domain for minimum deflection (i.e., strain) or stress using a structural mechanics algorithm for a composite article. FIG. 14 illustrates the use of finite element analysis to update design variables using an exemplary method of moving asymptotes (MMA) or a globally convergent method of moving asymptotes (GCMMA) algorithm that is looped in with the fluid flow CFD. In various aspects, the methods for minimizing the deflection include optimizing a structural topography and a fiber reinforcement angle within the three-dimensional domain model. In various examples, the fiber reinforcement angle of an optimized design space may be linked to the anisotropic tool path for three-dimensional printing of the fiber composite part.

The gradient-based algorithms are applied to a predetermined stress state located within the three-dimensional domain model in order to: (1) optimize the three-dimensional domain model for minimum deflection or stress using a structural mechanics algorithm for a composite article, and (2) provide a topologically optimized fiber composite part design and fiber orientation field.

Once obtained, the methods continue by using the topologically optimized fiber composite part design and fiber orientation field as an input to solve Gray-Scott reaction diffusion equations to generate an anisotropic tool path with a variable pitch for three-dimensional printing of the fiber composite part.

As is known in the art, reaction-diffusion systems are mathematical models that correspond to physical phenomena. In one example, a change in space and time of the concentration of one or more chemical substances is modeled. In mathematical terms, reaction-diffusion systems generally take the form of semi-linear parabolic partial differential equations represented by the general form as follows:

$$\partial_t q = \underline{D} \nabla^2 q + R(q),$$

where q(x, t) represents the unknown vector function, D is a diagonal matrix of diffusion coefficients, and R accounts for all local reactions. Reaction and diffusion of chemical species can produce a variety of patterns, reminiscent of those often seen in nature. The Gray-Scott equations model such a reaction and are generally provided as follows:

$$\frac{\partial u}{\partial t} = D_u \nabla^2 u - uv^2 + F(1-u),$$

$$\frac{\partial v}{\partial t} = D_v \nabla^2 v + uv^2 - (F+k)v.$$

The partial differential equations modeling this process may be simulated with a variety of numerical techniques. In various aspects, good results can be obtained using methods such as forward Euler integration of the finite-difference equations that one obtains by spatial discretization of the Laplacian, or the diffusion coefficients can be estimated for a target height field. For example, in various aspects the value of (pitch)^2 (i.e. one over the square of the height) can be used to approximate the diffusion coefficient. The pitch is inversely proportional to the height. A smaller pitch increases the density, providing the fibers closer to each other, which increases the height dimension.

The Gray-Scott reaction diffusion model is a mathematical model that describes the behavior of two chemical substances, and calculates the concentration of the two substances at a given time based upon the substances diffusion, feed rate, removal rate, and a reaction between the two. This simulation not only models the underlying process of a chemical reaction but can also result in patterns of the substances that are remarkably similar to patterns found in nature. Examples include patterns on animals, such as stripes on zebras, a leopard's skin, spots on butterflies, patterns on fish; fingerprints; ripples on sand; patterns of veins on a leaf; and various other biological phenomena. With the present technology, certain of the patterns resulting from this model can be used for the design of at least a portion of a fiber orientation angle distribution pattern.

To illustrate the model, one analogy presented is to imagine an area or space containing various concentrations of each chemical substance U and V at time zero. Over time, substance U is fed into the reaction at a given rate, while substance V is removed at a given rate.

Further, two molecules of V can react with one of U, which converts the substance of U to V as follows:

U+2V→3V

V→P

U, V, and P are chemical substances. A simulation is accomplished using the two partial differential equations listed above, each representing the change in concentration of a substance over time, where u and v are independent variables that represent their respective concentrations; $D_u$ and $D_v$ are their respective diffusion rates or diffusion tensors, which can be calculated from permeability. The parameter k represents the rate of conversion of V to P; and F represents the rate of process that feeds U and drains U, V, and P. The parameters k and F are arbitrary positive numbers that can be adjusted. Each diffusion tensor is generally a 3×3 matrix reflecting diffusion rates in different directions.

The change in u (upper partial differential equation) is dependent upon its reaction with v (hence the subtraction (−) of $uv^2$) and is fed at a certain rate (+F, scaled to its current concentration). The change in v (lower partial differential equation) is dependent upon its reaction with u (hence the addition (+) of $uv^2$), and is removed at a given rate (−k, scaled by the feed rate and concentration of V). The concentration of U or V at each position is updated at each time increment (typically 1) based upon the result of the corresponding equation. The values for the feed rate, removal rate, and diffusion rate are entered into the equations. For example, on a 2D grid, the Laplacian Operator could be calculated on a convolution matrix. To calculate the new concentration, the current concentration and each surrounding concentration is multiplied by the corresponding value in the matrix (where the current position corresponds to the center position in the convolution matrix) and all values summed. This value technically represents the difference in concentrations between the current position and the surrounding positions.

The above model can be programmed in a suitable computer code as is known in the art. In various aspects, the resulting model provides an image representing the reaction container, with each point or pixel of the image representing the concentration of V (v) at that position. For example, the Gray-Scott reaction diffusion equations can be solved with various numerical methods, such as the finite differential method or the finite element method. The initial value of u and v could be random noise distribution. By solving the Gray-Scott equations for some time period with an appropriate parameter set, a steady state is obtained. Then, the contour line of the obtained structure is interpreted as a fiber deposition path. For instance, by tracing the contour line of the median value of the field, the line traces the perimeter of the black domain. The single stroke line is obtained for each isolated black domain.

In various aspects, the present technology may use the Gray-Scott reaction diffusion equations to obtain an anisotropic pattern layout. This may include using an anisotropic diffusion tensor with the Gray-Scott equations. FIG. 11 illustrates an exemplary method flow chart for designing a fiber orientation pattern using an anisotropic diffusion tensor. As shown in FIG. 11, (x) means position dependent. The first execution of a strong anisotropic diffusion tensor field may generate a rough line and space pattern with a poor fill factor due to the large diffusion value. The second and later executions reduce defects, such as unnecessary very short branches. In certain aspects, the weakly anisotropic diffusion tensor field can be an isotropic diffusion tensor field; both weakly anisotropic and isotropic diffusion tensor fields improve the fiber fill factor.

In various aspects, a weak and strong anisotropic tensor set is alternately used to obtain a connected line and space pattern, along with the given orientation field. The lateral direction defines the path pitch. With an isotropic diffusion tensor, the ratio of the path pitch (a) to the length (b) can be represented as a:b=1:1. For a weakly anisotropic tensor, the ratio of a:b is between about 1:1 to about 1:5. For a strongly anisotropic tensor, the ratio of a:b may be up to about 1:100. By stretching the tensor in the longitudinal direction, which is the fiber direction, the line and space pattern can be obtained. In various aspects, at least two sets of diffusion tensors are used to repeatedly solve the reaction diffusion equations: an isotropic or weakly anisotropic set, and a strongly isotropic set. In various methods, the Gray-Scott equations may be solved for some time period, where the diffusion tensor sets alternate in strength from weak to strong. For example, the diffusion tensor may be switched from isotropic→anisotropic→isotropic. This may be repeated several times, preferably finishing with either a weakly anisotropic set or completely isotropic set. FIG. 12 illustrates an exemplary schematic generally summarizing methods for designing a tool path beginning with an estimated diffusion coefficient for the GS equations to obtain a fiber target pitch. The methods map the diffusion coefficient distribution from the height field, and the GS equations are solved using the diffusion coefficient distribution to generate a fiber path pattern. FIG. 13 illustrates an exemplary schematic describing the relationship between the height field and the resulting pitch of the fiber path pattern.

Figure 15A:
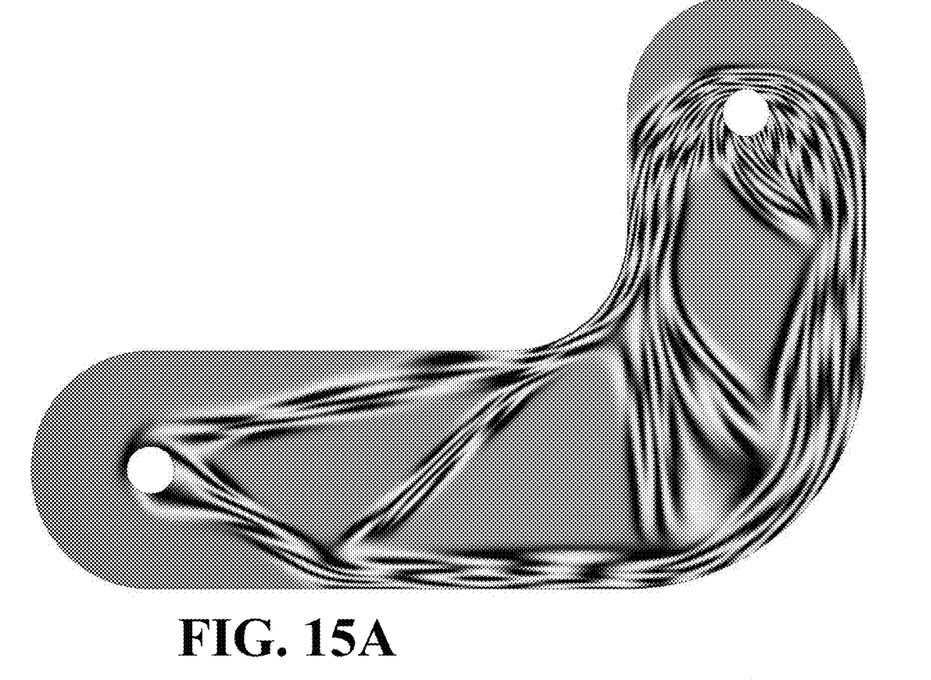
FIG. 15A provides an exemplary time dependent anisotropic Gray-Scott pattern with t=400 and a diffusion ratio (path pitch:length) of 1:100.
Figure 15B:
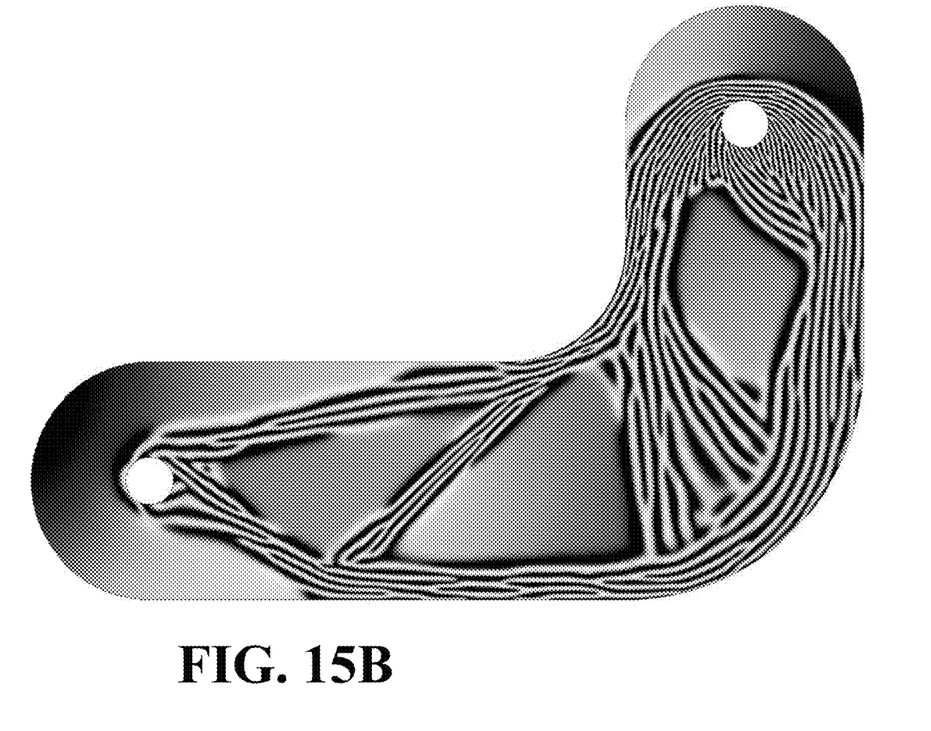
FIG. 15B provides an exemplary time dependent anisotropic Gray-Scott pattern with t=800 and a diffusion ratio (path pitch:length) of 1:5.
Figure 15C:
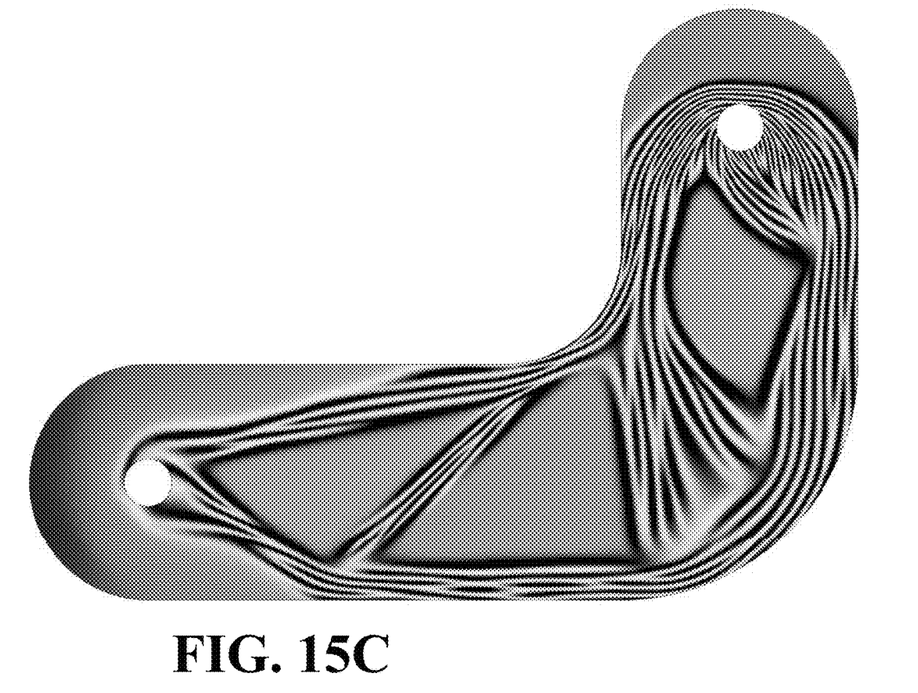
FIG. 15C provides an exemplary time dependent anisotropic Gray-Scott pattern with t=1200 and a diffusion ratio (path pitch:length) of 1:100.
Figure 15D:
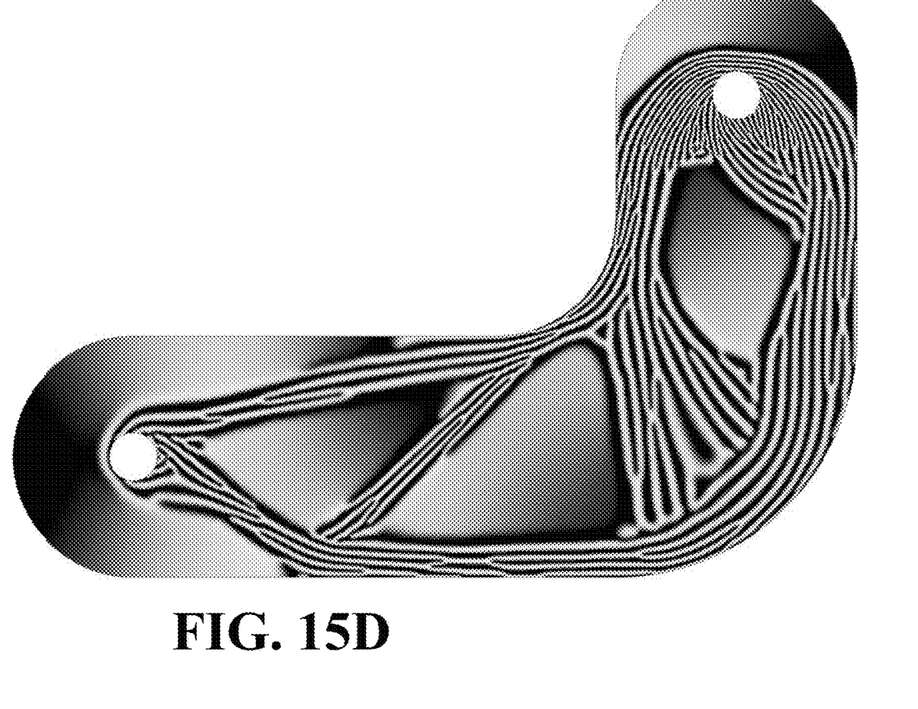
FIG. 15D provides an exemplary time dependent anisotropic Gray-Scott pattern with t=2000 and a diffusion ratio (path pitch:length) of 1:1.

In various aspects, the method of generating a tool path includes repeatedly solving the Gray-Scott reaction diffusion equations for a time period and alternating between using weakly anisotropic and strongly anisotropic diffusion tensors. In one specific example, the methods include finishing the repeated solving of the Gray-Scott reaction diffusion equations with either a weakly anisotropic set of diffusion tensors or an isotropic set of diffusion tensors. In this regard, FIGS. 15A-15D are provided herein to show the differences in design of the field pattern based on the type of diffusion tensor(s) used. The path width of fiber spacing in localized regions is based on one of a localized thickness of the fiber composite part and a localized predetermined stress state of the fiber composite part, where this fiber spacing may substantially affect the final out-of-plane thickness of the part. FIG. 15A provides an exemplary time dependent anisotropic Gray-Scott pattern with t=400 and a diffusion ratio (path pitch:length) of 1:100. FIG. 15B provides an exemplary time dependent anisotropic Gray-Scott pattern with t=800 and a diffusion ratio (path pitch:length) of 1:5. FIG. 15C provides an exemplary time dependent anisotropic Gray-Scott pattern with t=1200 and a diffusion ratio (path pitch:length) of 1:100. FIG. 15D provides an exemplary time dependent anisotropic Gray-Scott pattern with t=2000 and a diffusion ratio (path pitch:length) of 1:1.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A method of generating a tool path for three-dimensional printing of a fiber composite part, the method comprising:
    defining a three-dimensional domain model;
    determining a set of boundary conditions for the three-dimensional domain model;
    applying a gradient-based algorithm to a predetermined stress state located within the three-dimensional domain model in order to: (1) optimize the three-dimensional domain model for minimum deflection or stress using a structural mechanics algorithm for a composite article, and (2) provide a topologically optimized fiber composite part design and fiber orientation field; and
    using the topologically optimized fiber composite part design and fiber orientation field as an input to solve Gray-Scott reaction diffusion equations using an anisotropic diffusion tensor to generate an anisotropic tool path for three-dimensional printing of the fiber composite part.

2. The method of generating a tool path according to claim 1, wherein the three-dimensional domain model comprises a three-dimensional shape and size representative of the fiber composite part.

3. The method of generating a tool path according to claim 2, wherein the three-dimensional domain model comprises at least one of estimated data, extrinsic geometric data, and intrinsic geometric data.

4. The method of generating a tool path according to claim 3, wherein the extrinsic geometric data comprises polygonal mesh data, surface mesh data, computer aided design (CAD) data, or combinations thereof.

5. The method of generating a tool path according to claim 3, wherein the intrinsic geometric data comprises data obtained from a density distribution, rendering one or more volume images, a point cloud, a slice image data set, or combinations thereof.

6. The method of generating a tool path according to claim 1, comprising repeatedly solving the Gray-Scott reaction diffusion equations for a time period and alternate between using weakly anisotropic and strongly anisotropic diffusion tensors.

7. The method of generating a tool path according to claim 6, comprising finishing the repeated solving of the Gray-Scott reaction diffusion equations with either a weakly anisotropic set of diffusion tensors or an isotropic set of diffusion tensors.

8. The method of generating a tool path according to claim 1, further comprising configuring the anisotropic tool path for use with one of a continuous fiber printing (CFP) and tailored fiber placement (TFP) additive manufacturing technique.

9. The method of generating a tool path according to claim 1, comprising generating the tool path with a contour line of a scalar field.

10. The method of generating a tool path according to claim 1, wherein a path width of fiber spacing in a localized region is based on one of a localized thickness of the fiber composite part and a localized predetermined stress state of the fiber composite part.

11. The method of generating a tool path according to claim 1, wherein the gradient-based algorithm comprises one of a method of moving asymptotes (MMA) topology optimization and a globally convergent method of moving asymptotes (GCMMA) topology optimization.

12. The method of generating a tool path according to claim 1, further comprising obtaining the predetermined stress state within the three-dimensional domain model by applying a predetermined load to the three-dimensional domain model.

13. The method of generating a tool path according to claim 1, further comprising reviewing the anisotropic tool path for any areas that may include a branching pattern and modifying the anisotropic tool path to remove the branching pattern.

14. A three-dimensional fiber composite part made in accordance with the method of claim 1.

15. A three-dimensional printed fiber composite article comprising:
    at least one fiber reinforcement having a shape and size defining a three-dimensional domain space, the fiber reinforcement being disposed in the three-dimensional domain space in a predetermined pattern having a predetermined fiber direction and pitch path, wherein the predetermined pattern is based on an anisotropic tool path obtained by solving Gray-Scott reaction-diffusion equations using an anisotropic diffusion tensor.

16. The three-dimensional printed fiber composite article of claim 15, wherein the predetermined pattern includes a variable pitch path.

17. The three-dimensional printed fiber composite article of claim 16, wherein the path pitch is determined based on one of: a localized thickness of the fiber composite article, and a localized predetermined stress state of the fiber composite article.

18. The three-dimensional printed fiber composite article of claim 15, wherein the Gray-Scott reaction diffusion equations are repeatedly solved for a time period and alternate between using weakly anisotropic and strongly anisotropic diffusion tensors.

19. The three-dimensional printed fiber composite article of claim 15, wherein the at least one fiber reinforcement comprises one of: an engineering thermoplastic material; a plurality of fiber reinforcements; a fiber filament; and a fiber tow.

20. A method of generating a tool path for three-dimensional printing of a fiber composite part, the method comprising:
    defining a three-dimensional domain model;

determining a set of boundary conditions for the three-dimensional domain model;

applying a gradient-based algorithm to a predetermined stress state located within the three-dimensional domain model in order to: (1) optimize the three-dimensional domain model for minimum deflection or stress using a structural mechanics algorithm for a composite article, and (2) provide a topologically optimized fiber composite part design and fiber orientation field; and using the topologically optimized fiber composite part design and fiber orientation field as an input to solve reaction diffusion equations using an anisotropic diffusion tensor to generate an anisotropic tool path for three-dimensional printing of the fiber composite part.

* * * * *